US 6,701,375 B1

(12) United States Patent
Walker et al.

(10) Patent No.: US 6,701,375 B1
(45) Date of Patent: Mar. 2, 2004

(54) ULTRA-LOW BANDWIDTH INTRA-NETWORK ROUTING METHOD

(75) Inventors: W. Clinton Walker, Artesia, CA (US);
David C. Bixler, Hermosa Beach, CA (US); Neil G. Siegel, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/235,544

(22) Filed: Jan. 22, 1999

(51) Int. Cl.[7] .................. G06F 15/173; H04L 12/28; H04L 12/56
(52) U.S. Cl. .................. 709/243; 709/229; 370/355
(58) Field of Search .................. 709/232, 238, 709/204, 233, 243, 227; 370/254, 425, 256, 352, 355

(56) References Cited

U.S. PATENT DOCUMENTS

| | | | |
|---|---|---|---|
| 5,631,897 A | * | 5/1997 | Pacheco et al. ............. 370/237 |
| 5,680,116 A | * | 10/1997 | Hashimoto et al. ......... 370/254 |
| 5,872,773 A | * | 2/1999 | Katzela et al. ............. 370/256 |
| 5,968,128 A | * | 10/1999 | Lauck et al. ............... 709/232 |
| 6,118,768 A | * | 9/2000 | Bhatia ........................ 370/254 |

OTHER PUBLICATIONS

R. Perlman, *Interconnections: Bridges and Routers*, pp. 132–134, Addison–Wesley Pub. Co. (1992).

* cited by examiner

*Primary Examiner*—Dung C. Dinh
(74) *Attorney, Agent, or Firm*—Suzanne J. Heeg

(57) ABSTRACT

A technique for saving bandwidth that is otherwise used by the transmission of continual administrative message traffic in an intranet. A data packet originating from one host computer (18A) and addressed another (18B) is first sent to a local router (16A), which broadcasts a request for the address of the destination node. Another router (16B) local to the destination host (18B) recognizes the destination host in the data packet and supplies a response with the correct address for the destination host. The broadcast request and its response are transmitted over an auxiliary channel, which avoids depleting the bandwidth capacity of the intranet. When the response is received, the local router (16A) associated with the first host computer 18A sets up a switched virtual circuit to the other router (16B), after which the data packet and others following it can be delivered efficiently to the destination host (18B). The second router (16B) uses source address information in the first delivered data packet to set up a return path along the same switched virtual circuit, to allow transmission of data packets in both directions. When one of the routers (16A, 16B) detects an absence of data packet transmissions along the switched virtual circuit for a selected time, the circuit is deactivated.

7 Claims, 3 Drawing Sheets

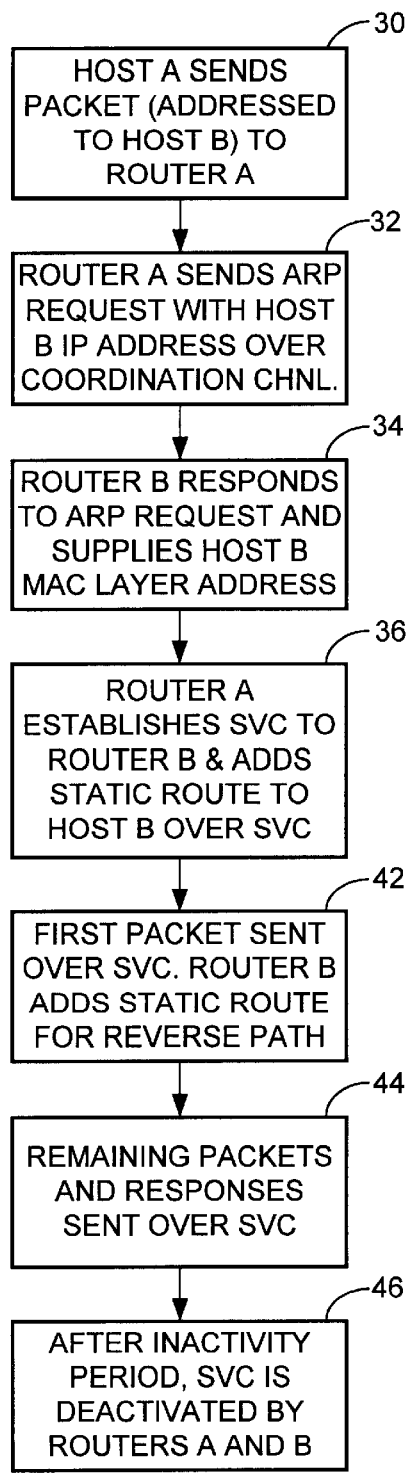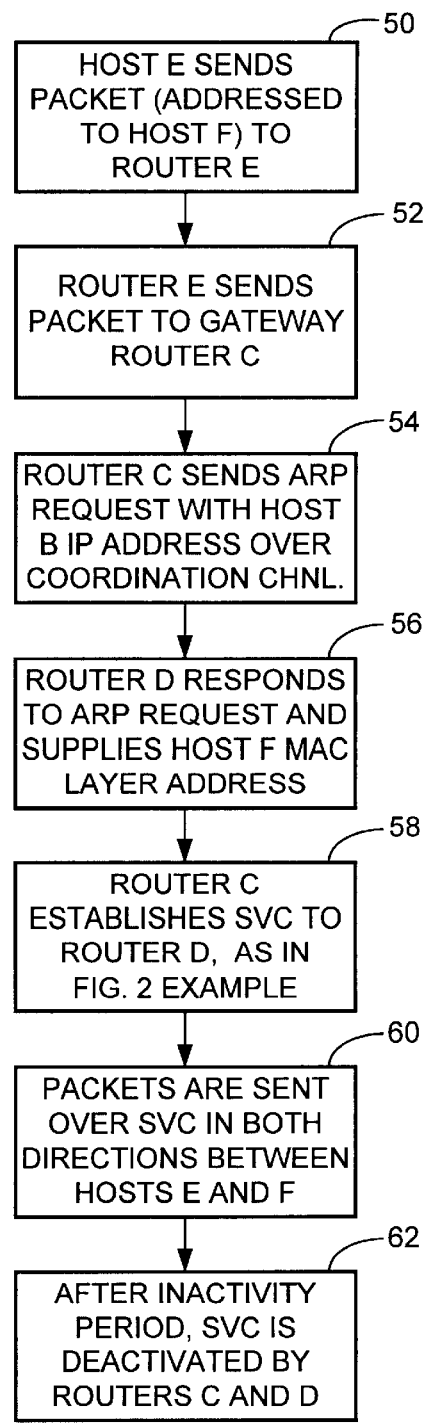
FIG. 2
FIG. 3

ULTRA-LOW BANDWIDTH INTRA-NETWORK ROUTING METHOD

This invention was made with Government support under contract number DAAB07-95-D-E604 awarded by the Department of the Army. The Government has certain rights in this invention.

BACKGROUND OF THE INVENTION

This invention relates generally to networks of interconnected computers and, more particularly, to techniques for routing messages or data packets from one node to another in a "locally" located intranet. The nature of the invention first requires a few definitions by way of background. Relatively small networks, perhaps of up to a few hundred nodes and typically located in a single building or group of buildings, are referred to as local area networks (LANs). When the nodes are further apart, the terms "wide area network" or "metropolitan area network" are sometimes used, but the distinction is one of degree and the definitions sometimes overlap. LANs are typically interconnected through switching nodes called bridges and routers, to form a large "internet" of interconnected computer nodes.

The internet with which most computer users are familiar is referred to as the Internet. Interconnection of nodes on the Internet, and the transmission of data between them, is governed by a set of protocols defined by the Internet community and called the Internet protocol (IP) suite, or sometimes the TCP/IP suite. (TCP is "transmission control protocol.")

The term "intranet" is used to refer to a localized portion of the Internet that is confined to a specific enterprise, such as a corporation or a governmental, educational or military organization. An intranet typically includes multiple interconnected LANs and may extend over a large geographical area. Use of the term intranet implies a commonality of interest among the users of the nodes in the intranet, and usually a commonality of ownership and control as well.

Multiple intranets are interconnected in the Internet by high-bandwidth "backbone" communication links, such as leased lines. Individual LANs in the Internet may also have relatively high bandwidth, which is a measure of their data carrying capacity. There are some situations, however, in which the bandwidth of an intranet is severely strained by the traffic of data packets and administrative messages being transmitted. This is especially true for intranets including increasingly popular wireless and mobile communications nodes. In wireless networks, the bandwidth is inherently limited in comparison to networks that use coaxial cables or optical fibers as a transmission medium.

In the Internet, messages and data are addressed to users by user name, i.e., a name that the user of a network node has selected or has been assigned, and a domain name, which is usually a name, nickname or abbreviation selected by an organization with which the user is affiliated in some way, as an employee or subscriber, for example. One of the main problems that must be solved in inter-networks is to determine the path that data packets should traverse to reach end destinations. This problem is usually addressed by devices known as routers, or by routing software in host platforms. Routers make decisions regarding packet forwarding based on numeric addresses, rather than symbolic names. The host computer that originates the packet (the "source" computer) has the responsibility of determining the numeric address ("IP address") of the destination, generally by using services provided by special network nodes referred to as "name servers". After determining the IP address of the destination, the source will send the message, in one or more data packets, to the local router for further processing.

There are a number of options that can be employed by such routers in order to make proper forwarding decisions, but they fall into two main categories: the routers can be pre-programmed with "static" routing information, or they can run a dynamic routing protocol. In the latter case, the routers constantly exchange administrative data packets throughout the network; these administrative data packets contain the information required for the routers to find paths to the destinations of interest. The first approach ("static routing"), has the advantage of not requiring continual usage of network bandwidth for the exchange of such administrative information, but has two main disadvantages: First, it complicates the network planning process, since all possible routing paths must be anticipated and included in the routing tables of each router in the network; Second, it does not allow adaptations to failed communication links, or to hosts that join the network at arbitrary locations after the planning process has been completed. This second shortcoming may be less important in an environment where hosts do not move and the communication media are extremely reliable, but is not suitable for a wireless network with mobile communication nodes.

The second approach ("dynamic routing") overcomes the disadvantages of the static approach, but at the cost of the communications load burden on the communications network of the continuous exchange of administrative data packets containing routing information between each of the routers. In most applications of the Internet, the additional bandwidth overhead imposed by these messages does not degrade network performance significantly. Even in intranets in which bandwidth has become limited for one reason or another, the overhead is tolerated because it serves a necessary function, and because connection to the Internet requires adherence to TCP/IP standards.

An intranet with an inherently low bandwidth, however, such as an intranet that includes wireless LANs, is more significantly affected by the overhead of these administrative messages used for path finding and routing purposes. Therefore, there is a need for a method of message routing within an intranet that can operate without the bandwidth overhead usually associated with the Internet, but which still allows connection to the Internet in conformance with TCP/IP standards. The present invention satisfies this need.

SUMMARY OF THE INVENTION

The present invention resides in a method for establishing a communication path between two nodes of an intranet without using the conventional path finding and routing techniques associated with networks. Briefly, and in general terms, the method of the invention comprises the steps of: using an auxiliary communication channel to establish switched virtual circuit between a first router associated with a first host and a second router associated with a second host; transmitting data packets in both directions over the switched virtual circuit; and deactivating the switched virtual circuit when packet transmission activity has ceased for a selected time. Before establishing the switched virtual circuit, the method "finds" the second router associated with the second or "destination" host computer.

More specifically, the method may be defined as including the steps of: transmitting from a first host in an intranet, a first data packet addressed to a second host in the same intranet; receiving the first data packet at a first router near the first host; broadcasting from the first router, over an auxiliary communication channel, a request message identifying the second host; receiving the request message at a second router, which recognizes the second host identified in the request; transmitting over the auxiliary communication channel a response to the request message from the second router to the first router, providing a complete address for the second host; establishing in the first router, upon receiving the response to the request message, a switched virtual circuit between the first and second routers; transmitting the first data packet from the first router to the second router over the switched virtual circuit; and transmitting the first data packet from the second router to the second host, to complete delivery of the first data packet.

The method may further comprise the steps of: retrieving the address of the first host from the first data packet upon its arrival at the second router; and using the address of the first host in the second router, to establish a return path for data packets to be transmitted from the second host to the first host. When the return path has been established, the method further includes transmitting second and additional data packets from the second host to the first host over the switched virtual circuit, and transmitting other additional data packets from the first host to the second host over the switched virtual circuit.

For termination of transmission over the switched virtual circuit, the method also includes the steps of sensing in one of the first and second routers that there has not been any transmission of data packets over the switched virtual circuit for some selected time interval; and deactivating the switched virtual when the sensing step determines that the selected time of inactivity has elapsed.

In one disclosed embodiment of the invention, the first and second hosts are attached to different networks, neither of which has an auxiliary communication channel, and the step of transmitting a first data packet to the first router includes transmitting the first data packet through a second network to which the first host and the first router are both connected. In addition, the step of transmitting the first data packet from the second router to the second host includes transmitting the first data packet through a third network to which the second host and the second router are both connected, and the subsequent steps of transmitting second and additional data packets include transmitting them through the second and third networks.

It will be appreciated from the foregoing summary that the present invention represents a significant improvement in the field of network communication. In particular, the invention provides a technique for establishing a communication path in a very-low bandwidth intranet, such as a wireless intranet, without sacrificing bandwidth capacity for use by continual administrative messages. Other aspects and advantages of the invention will become apparent from the following more detailed description, taken in conjunction with the accompanying drawings.

BRIEF DESCRIPTION OF THE DRAWINGS

FIG. 2 is flowchart depicting the sequence of operations performed in accordance with the invention in establishing a communication path between nodes A and B of FIG. 1;

FIG. 3 is flowchart depicting the sequence of operations performed in accordance with the invention in establishing a communication path between nodes E and F of FIG. 1.

DESCRIPTION OF THE PREFERRED EMBODIMENT

Figure 1:
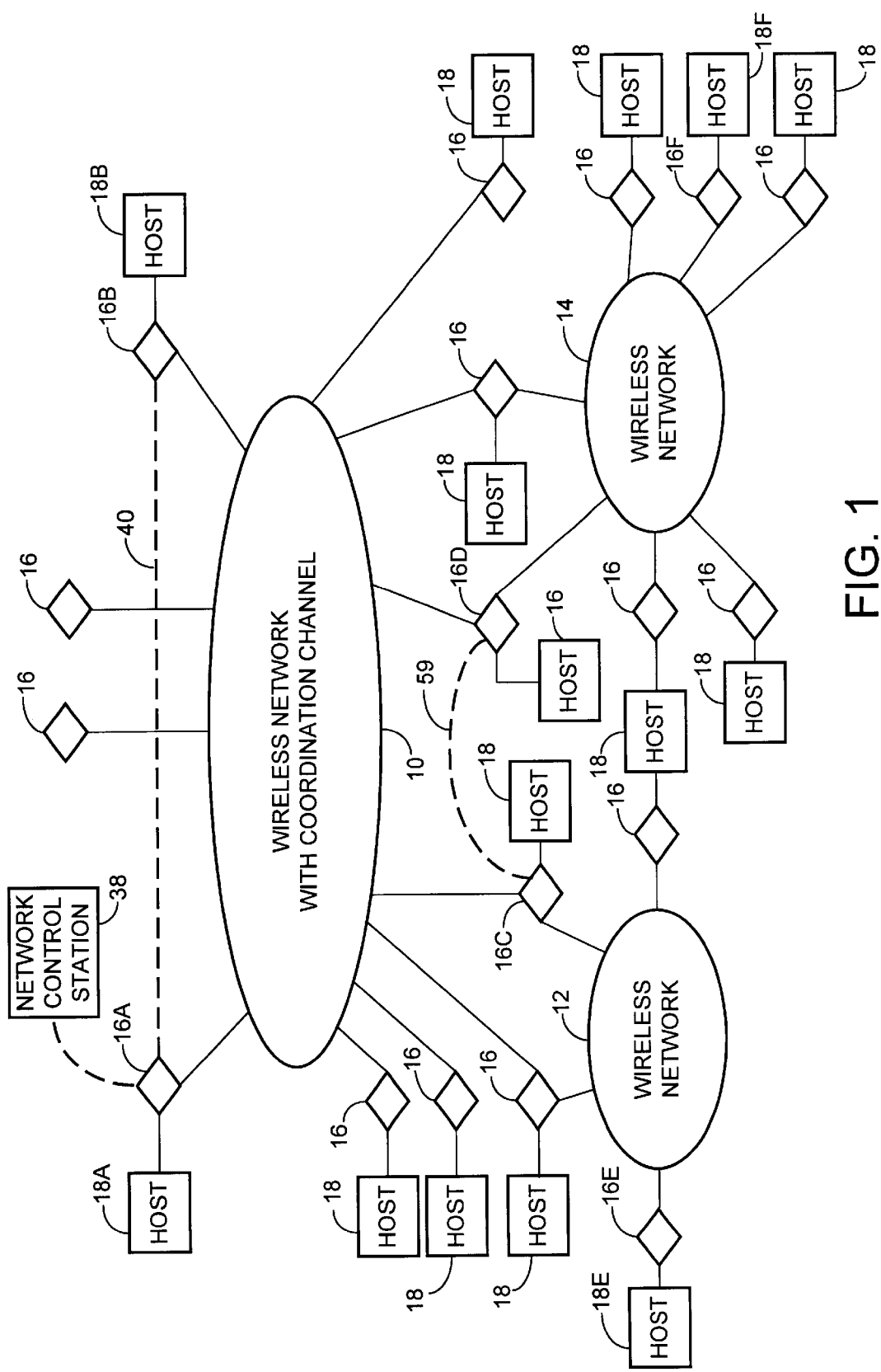
FIG. 1 is a block diagram of a wireless intranet employing the principles of the present invention.

As shown in the drawings for purposes of illustration, the present invention pertains to a method for establishing a communication path between two nodes of a computer intranet without the costly bandwidth overhead usually associated with path finding and routing functions in a network.

FIG. 1 is an illustrative intranet employing the present invention and having three wireless networks, indicated by reference numerals 10, 12 and 14, respectively. Wireless network 10 differs from the other two wireless networks in that it has a coordination channel associated with it. A coordination channel is a separate radio communication channel through which all the nodes connected to the network may communicate independently of a main communication channel through which data packets are transmitted. The coordination channel may be used in a wireless network to avoid or reduce collisions between transmissions from different nodes. Networks conventionally employ collision sensing and repeated transmissions to avoid conflicts between messages from different sources, but if collisions can be prevented by use of the coordination channel, the useful bandwidth can be increased. The coordination channel itself uses very little bandwidth and may, for example, be accommodated in a different frequency band from the main communication channel, or may utilize a separate time slot if time division multiplexing is used. A specific implementation of the coordination channel is further described below with reference to FIG. 4.

The wireless networks 10, 12 and 14 each have a plurality of switch nodes or routers 16 connected to them. Each router 16 may be connected to one or more of the networks 10, 12 and 14 and to other networks not shown in the figure. Each router 16 may also have a plurality of endnodes or hosts 18 connected to it. Any of these hosts 18 should be able to communicate with any other of the hosts. The difficulty, as described earlier in this specification, is that the router 16 associated with a source host 18 must have address information pertaining to the router associated with a destination host. Maintaining this address information using a conventional Internet approach requires the continual transmission of administrative messages, and this imposes a sometimes unacceptable bandwidth overhead for wireless intranets.

In accordance with the invention, communication between hosts 18 in an intranet is effected by establishing a pathway between the hosts at the time that transmission of a message or messages is desired. Moreover, establishment of the message pathway or route is achieved by use of the coordination channel of at least one network in the intranet. The following example should clarify this concept.

Suppose the user of host A, indicated by reference numeral 18A, wishes to establish communication with the user of host B 18B. Both host A and host B are connectable, through respective routers 16A and 16B, to wireless network 10, which includes a coordination channel. The steps by which a communication path is established between host A and host B are specified in the flowchart of FIG. 2. First, as shown in block 30, host A sends a message destined for host B to its (host A's) local router 16A. At this stage, router 16A already knows, or can obtain, host B's IP (Internet protocol) address. Some additional terms need to be defined by way of further background before continuing this description.

Computer network architecture is usually designed and described in terms different functional layers, in accordance with the OSI (Open Systems Interconnection) Reference Model defined by the ISO (International Standards Organization). The basic principal of layering is that each layer is responsible for providing some service to the layer above and does so by using the services of the layer below. Each layer communicates with its peer layer in other nodes of the network, through use of a protocol for that layer, and this communication is accomplished by direct communication with the layer immediately below. For purposes of this discussion, the lowest three layers of the OSI model are relevant.

The lowest layer is the physical layer, the specifics of which are dependent on the nature of the transmission medium used by the network. The physical layer protocol deals with such issues as conversion of bits of information into electrical signals and bit-level synchronization in a data transmission. The next layer above the physical layer is called the data link layer, and its function is to transmit blocks of information across a communication link. Another important function is addressing of individual hosts in a LAN, using a datalink layer address.

The next layer up is called the network layer, and its function is to allow any pair of nodes in the network to communicate with each other. The network layer protocol deals with such issues as finding a path through a series of interconnected nodes, data packet fragmentation and re-assembly, when needed, and congestion control. Other layers above the network layer in the OSI model include the transport layer, the session layer, the presentation layer and the application layer, but these are not material to the present discussion. A data packet generated in the application layer for transmission onto the network is processed through successively lower layers until it reaches the physical layer and the transmission medium. The session layer adds a session header to the packet, the transport layer adds a transport header, the network layer adds a network header, and the data link layer adds a data link header. When the same data packet passes up through the layers in a receiving node, these headers are processed by the respective layers and stripped off the data packet.

The network header includes such information as a destination address. Intermediate nodes designated as routers perform their function at the network layer level, specifically by using information in the network header of each data packet. The router determines, from the destination network layer address in the network header, which direction to transmit the packet. Before retransmission, the network header may be updated to reflect that the packet has been processed through this particular route "hop."

By way of further background, transmission of data between two end nodes in a large network may be effected by either of two general techniques. One is referred to as "connectionless" data exchange, or "datagram," in which each data packet is routed through the network independently of other packets. The network does its best to deliver all the packets pertaining to a single message in their original sequence, but there is some probability that this may not happen. The other approach is connection-oriented service, in which a more permanent virtual connection is established between two nodes in a network and, once the connection is established, two-way communication may proceed without concern for independent packets being lost or transposed, because the packets are all transmitted along the same route in sequence. The present invention avoids the difficulties of the prior art by establishing a virtual circuit between two network nodes, as will now be described in further detail.

As already noted above with respect to block 30, the first step in establishing the virtual circuit is for host 18A to transmit a packet addressed to host 18B to host A's local router 16A. Next, as indicated in block 32, router 16A broadcasts an address resolution protocol (ARP) query over the coordination channel of the wireless network 10. A further digression is needed at this point to explain the need for this step.

Router 16A is assumed to know already the IP address (network layer address) of the destination host 18B. Unfortunately, a destination address in the form of a 32-bit network layer address is sufficient to reach a destination end node or host system if the host is attached to the network directly with a dedicated point-to-point link between the host and a router. In the more general case, the destination host may be attached to a LAN, which is in turn attached to the network through one or more routers. In this instance, delivery of a message to its final destination host requires knowledge of the host's data link layer address, which is not always known to routers.

The ARP query allows an originating router to learn the data link layer address corresponding to a destination host for which a network layer address is known. In the example shown in FIG. 1, all of the hosts 18 and routers 16 connected to the wireless network 10 receive the ARP query over the coordination channel. Router 16B, which has knowledge of host 18B's address, transmits an ARP response message over the coordination channel, as indicated in block 34. The ARP response message includes the requested datalink layer address for destination host 18B. In accordance with a standard established for some types of LANs, the data link layer is subdivided into two sublayers, one of which is the medium access control (MAC) layer. Therefore, the address provided in an ARP response is sometimes referred to as the MAC sublayer address.

Next, router 16A, with knowledge of the complete destination address for host 18B, establishes an emulated switched virtual circuit (SVC) between host 18A and host 18B, as indicated in block 36. SVC is the terminology used in the connection-oriented network layer protocol of the ISO, and is sometimes referred to as "X.25" service, a protocol originally developed by the CCITT (ComitΘ Consultatif Internationale de TelegraphiquΘ et TelephoniquΘ). Router 16A defines a static route to host 18B via the new switched virtual circuit, by transmitting a special message sequence to a network control station 38 of the wireless network 10. The emulated SVC is indicated by the line 40 between the routers 16A and 16B.

A first data packet is then transmitted over the new circuit, as indicated in block 42. The transmitted packet passes from host 18A to router 16A, and from there via the virtual circuit to router 16B, which routes the packet to host 18B. When this first data packet is processed by router 16B, source address information is extracted from the packet header and used to establish a static route back to host 18A by the new virtual circuit.

Other data packets may then be transmitted in either direction between the hosts 18A and 18B, as indicated in block 44. Finally, as indicated in block 46, after the circuit has been inactive for a selected time period, routers 16A and 16B deactivate the switched virtual circuit.

It will be observed from FIG. 1 that not all of the hosts 18 are connected directly to the wireless network 10 with the coordination channel. For example, a different problem is presented in establishing communications between host 18E, which is connected to wireless network 12 through router 16E, and host 18F, which is connected to wireless network 14 through router 16F. The steps followed to establish this connection are shown in FIG. 3.

First, as indicated in block 50, host 18E transmits a data packet addressed to host F to its local router 16E. Router 16E forwards the packet to a gateway router 16C that provides a connection to the network 10 with the coordination channel, as indicated in block 52, using a previously determined datalink layer address for router 16C.

Then gateway router 16C broadcasts an ARP query message over the coordination channel, as indicated in block 54, requesting the datalink layer, or MAC sublayer, address for host 18F. Gateway router 16D sends a proxy ARP response on behalf of host 18F, as indicated in block 56, providing the MAC sublayer address corresponding to the interface between router 16D and wireless network 10. Gateway router 16D responds to the ARP query because the router has the IP address for host 18F in a "client list" maintained in this router.

As indicated in block 58, a switched virtual circuit is established between routers 16C and 16D, as indicated by line 59, in the same manner as described in the previous example using hosts 18A and 18B as the source and destination. As indicated in block 60, data packets are transmitted in both directions through the established circuit. Packets for host 18F arriving at router 16D are forwarded through network 14 in a conventional manner. Similarly, packets for host 18E are forwarded through network 12 in a conventional manner. Finally, as indicated in block 62, routers 16C and 16D inactivate the circuit after a period of inactivity has been sensed.

Figure 4:
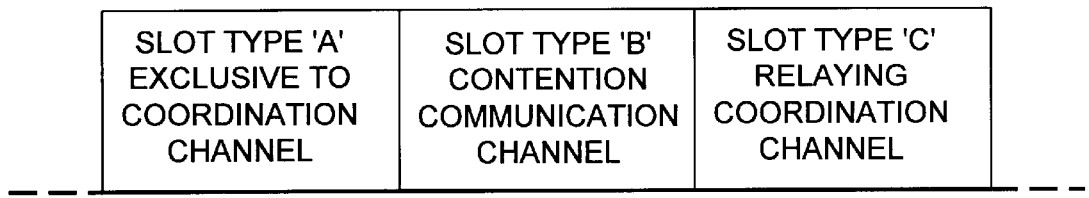
FIG. 4 is a diagram depicting time slot types in a time-division multiple-access communication channel.

The coordination channel of the wireless network 10 is implemented in a presently preferred embodiment by employing a time-division multiple-access (TDMA) technique. Basically, the time available for broadcast over a wireless communication channel is divided into time slots that are allocated to carry specific types of information on TDMA sub-channels. As indicated in FIG. 4, one set of time slots, referred to as type A slots, is reserved exclusively to carry coordination channel messages, such as the ARP requests described in block 32 (FIG. 2) and block 54 (FIG. 3). Regular message traffic between hosts 18 is transmitted during time slots of type B, for which the nodes may have to contend in accordance with conventional CSMA (collision sense multiple-access) rules. A third time slot type (C) is used to perform an automatic relaying function. Hosts 18 on the coordination network automatically re-broadcast coordination network messages in one of the relay time slots. The proportion of time slots allocated to each type may be selected or adjusted in accordance with the network configuration or traffic conditions. In one implementation of an intranet having approximately 1,000 wireless nodes, path finding in accordance with the invention is effective close to 100% of the time of operation, but uses only about 1% of the network capacity.

In the currently implemented embodiment, the nodes are divided into two layers. Only about one-third of the nodes participate directly in the path-finding/physical-address-determination process, using automatically relayed broadcasts over the coordination channel. The remaining nodes are serviced using a "proxy" concept. Each of the directly participating nodes maintains a list of some of the nodes that participate only by proxy, and which can be reached in only one "hop" from the directly participating node. When a request to establish connection service is received by a participating node acting as a proxy, the receiving node responds as if the request was intended for the directly participating node. On receipt of data messages, the proxy node forwards them to the intended destination. Protocol mechanisms ensure that the proxy lists are maintained automatically and that no more than one proxy node responds to an original service request on the coordination network. An alternative to this two-layer configuration is a single-layer configuration in which every node in the intranet listens to directly for service requests broadcast on the coordination network.

As noted above, the present invention is implemented in an intranet that has relatively low bandwidth capacity. Such an intranet may, however, still interface with components of a larger internet, such as the Internet. The interface will normally be effected through routers that have connections to both the intranet and the internet. These routers must execute standard exterior gateway protocols in order to connect the intranet properly with the larger-scale internet.

It will be appreciated from the foregoing that the present invention represents a significant improvement in techniques for establishing a communication path in a large interconnected network having limited bandwidth capacity. In particular, the invention provides for establishment of a virtual circuit between any two hosts in the network, using a coordination channel to set up the virtual circuit without the need for the transmission of large numbers of administrative messages, which can occupy a large proportion of the available bandwidth. It will also be appreciated that, although an illustrative embodiment of the invention has been described in detail, various modifications may be made without departing from the spirit and scope of the invention. For example, the coordination channel may be implemented using multiplexing schemes other than TDMA, such as wavelength division multiplexing. Accordingly, the invention should not be limited except as by the accompanying claims.

What is claimed is:

1. A method for establishing a communications path between two host computers in a low-bandwidth intranet, comprising the steps of:

using an auxiliary communication channel to establish a switched virtual circuit between a first router associated with a first host and second router associated with a second host, the first router defines a static route from the first host to the second host via the switched virtual circuit based on a first data packet sent from the first host and addressed to the second host;

establishing a static route from the second host to the first host via the switched virtual circuit based on source address information extracted from the first data packet by the second router;

transmitting data packets in both directions over the switched virtual circuit via the established static routes; and deactivating the switched virtual circuit when packet transmission activity has ceased for a selected time.

2. A method for establishing a communications path between two host computers in a low-bandwidth intranet, comprising the steps of:

transmitting from a first host in an intranet, a first data packet addressed to a second host in the same intranet;

receiving the first data packet at a first router near the first host;

broadcasting from the first router, over an auxiliary communication channel, a request message identifying the second host;

receiving the request message at a second router, which recognizes the second host identified in the request;

transmitting over the auxiliary communication channel a response to the request message from the second router to the first router, providing a complete address for the second host;

establishing in the first router, upon receiving the response to the request message, a switched virtual circuit between the first and second routers;

transmitting the first data packet from the first router to the second router over the switched virtual circuit; and transmitting the first data packet from the second router to the second host, to complete delivery of the first data packet.

3. A method as defined in claim 2, and further comprising the steps of:

retrieving the address of the first host from the first data packet upon its arrival at the second router; and using the address of the first host in the second router, to establish a return path for data packets to be transmitted from the second host to the first host.

4. A method as defined in claim 3, and further comprising the steps of:

transmitting second and additional data packets from the second host to the first host over the switched virtual circuit.

5. A method as defined in claim 4, and further comprising the steps of:

transmitting additional data packets from the first host to the second host over the switched virtual circuit.

6. A method as defined in claim 5, and further comprising the steps of:

sensing in one of the first and second routers that there has not been any transmission of data packets over the switched virtual circuit for some selected time interval; and deactivating the switched virtual circuit between the first and second hosts when the sensing step determines that the selected time of inactivity has elapsed.

7. A method as defined in claim 2, wherein:

the first and second hosts are attached to different networks, neither of which has an auxiliary communication channel;

the step of transmitting a first data packet to the first router includes transmitting the first data packet through a second network to which the first host and the first router are both connected;

the step of transmitting the first data packet from the second router to the second host includes transmitting the first data packet through a third network to which the second host and the second router are both connected; and the subsequent steps of transmitting second and additional data packets include transmitting them through the second and third networks.

* * * * *